United States Patent
Ou

(10) Patent No.: US 9,246,639 B2
(45) Date of Patent: Jan. 26, 2016

(54) METHOD AND DEVICE FOR ENSURING QUALITY OF SERVICE OF INTERNET PROTOCOL TELEVISION LIVE BROADCAST SERVICE

(75) Inventor: Xiongbing Ou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 153 days.

(21) Appl. No.: 13/540,062

(22) Filed: Jul. 2, 2012

(65) Prior Publication Data

US 2012/0278845 A1 Nov. 1, 2012

Related U.S. Application Data

(63) Continuation of application No. PCT/CN2010/080611, filed on Dec. 31, 2010.

(30) Foreign Application Priority Data

Dec. 31, 2009 (CN) .......................... 2009 1 0238876

(51) Int. Cl.
*H04N 7/173* (2011.01)
*H04L 1/18* (2006.01)
*H04L 1/00* (2006.01)

(52) U.S. Cl.
CPC ............ *H04L 1/1835* (2013.01); *H04L 1/1887* (2013.01); *H04L 1/188* (2013.01); *H04L 2001/0093* (2013.01); *H04L 2001/0097* (2013.01)

(58) Field of Classification Search
None
See application file for complete search history.

(56) References Cited

U.S. PATENT DOCUMENTS

2003/0135784 A1* 7/2003 Yamaguchi et al. ............ 714/18
2007/0250890 A1* 10/2007 Joshi et al. .................... 725/120

(Continued)

FOREIGN PATENT DOCUMENTS

| CN | 1852076 A | 10/2006 |
|---|---|---|
| CN | 101166106 A | 4/2008 |
| CN | 101316357 A | 12/2008 |
| JP | 2003209576 A | 7/2003 |

OTHER PUBLICATIONS

1st Office Action in corresponding Chinese Patent Application No. 200910238876.9 (Apr. 16, 2012).
Extended European Search Report in corresponding European Patent Application No. 10840609.1 (Oct. 9, 2012).

(Continued)

*Primary Examiner* — Nasser Goodarzi
*Assistant Examiner* — Adil Ocak
(74) *Attorney, Agent, or Firm* — Leydig, Voit & Mayer, Ltd.

(57) ABSTRACT

Embodiments of the present invention provide a method for ensuring quality of service of an Internet Protocol television live broadcast service, and the method includes: detecting a live broadcast packet received from an original multicast group (100); if detecting that the live broadcast packet has an error or a loss, joining a multicast group corresponding to a delay multicast stream sent by a retransmission server, and receiving a delay retransmission packet from the delay multicast stream (102); and recovering the live broadcast packet according to the received delay retransmission packet (104). Correspondingly, a terminal and a retransmission server are provided. Once the terminal detects that the original packet has a loss or an error, the terminal directly receives a packet from a delay packet stream sent by the retransmission server for recovering, thereby avoiding a NACK storm, simplifying the processing of the retransmission server, and improving the retransmission efficiency.

12 Claims, 4 Drawing Sheets

(56) References Cited

U.S. PATENT DOCUMENTS

| | | |
|---|---|---|
| 2007/0268899 A1 | 11/2007 | Cankaya |
| 2008/0117336 A1* | 5/2008 | Gao ............................. 348/731 |
| 2008/0201752 A1 | 8/2008 | Liu et al. |
| 2009/0319845 A1* | 12/2009 | Liu et al. ....................... 714/747 |
| 2010/0020690 A1* | 1/2010 | Komiya et al. ............... 370/235 |

OTHER PUBLICATIONS

International Search Report in corresponding International Patent Application No. PCT/CN2010/080611 (Apr. 7, 2011).

Written Opinion of the International Searching Authority in corresponding International Patent Application No. PCT/CN2010/080611 (Apr. 7, 2011).

* cited by examiner

METHOD AND DEVICE FOR ENSURING QUALITY OF SERVICE OF INTERNET PROTOCOL TELEVISION LIVE BROADCAST SERVICE

CROSS-REFERENCE TO RELATED APPLICATIONS

This application is a continuation of International Application No. PCT/CN2010/080611, filed on Dec. 31, 2010, which claims priority to Chinese Patent Application No. 200910238876.9, filed on Dec. 31, 2009, both of which are hereby incorporated by reference in their entireties.

FIELD OF THE INVENTION

The present invention relates to the field of communications technologies, and in particular, to a method and a device for ensuring quality of service of an Internet Protocol television live broadcast service.

BACKGROUND OF THE INVENTION

In recent years, operators focus on an Internet Protocol Television (Internet Protocol Television, IPTV for short) service, in which a set top box together with a television serves as a terminal, a broadband IP serves as a transmission technology, and the service is centered on an audio-visual service and integrates instant communications, games and information services into a whole. From the second half of 2004, the national operators accelerate the pace of IPTV pilot construction. As an emerging service providing manner, the IPTV provides potential opportunities of new services, new income and new business modes, which may bring new profit growth to the communication and media service providers.

A live broadcast service as an IPTV basic service is the inheritance of the conventional television service, and quality of service of the live broadcast service should be at least equivalent to that of the existing cable television to ensure competitiveness of the IPTV. Therefore, the ensuring quality of service (Quality of Service, QoS for short) of the live broadcast service is crucial to the smooth development of the IPTV services.

The packet loss or packet error may occur during transmission over the IP network. Forward Error Correction (Forward Error Correction, FEC for short) and Auto Repeat Request (Auto Repeat Request, ARQ for short) technologies are two common methods in the IPTV services to recover an original packet, and may also be used to ensure the QoS of the live broadcast service. The FEC technology is easily implemented, but needs to consume more redundant bandwidth, and moreover cannot recover the packet when being beyond the error correction capability. Therefore, in the actual application and standard organizations, the ARQ manner is usually used to recover the lost or error packet.

In the ARQ manner, a terminal receives multicast packet data corresponding to the live broadcast service, decodes the data and then outputs it, and in the receiving process, the terminal further detects whether the packet loss or error occurs according to a packet loss detection algorithm. If the packet loss or error occurs, a Nack message for request for data retransmission is directly sent to a retransmission server, and after receiving the Nack retransmission request, the retransmission server retransmits a designated packet to the terminal according to the instruction of the Nack message.

Through the method, the retransmission request of each terminal may be quickly fed back to the retransmission server. However, if the packet loss is not caused by the user side but occurs in an aggregation layer or a core node layer of the transmission network, every user can sense the packet loss. In such a case, the retransmission server may receive the Nack retransmission requests sent from multiple terminals almost at the same time (this condition is referred to as a Nack storm). The Nack storm in a short period may result in the following two problems:

1. A load of the retransmission server is increased instantly, which may possibly cause the abnormal working state or cause that the retransmission requests of some terminals cannot be responded timely.

2. Data packets are retransmitted to multiple users at the same time, which causes that the occupied network bandwidth is increased sharply. As a result, it is difficult to plan the network bandwidth, network congestion may be possibly caused, the packet loss is further intensified, and the whole system is caused to be in an unstable state.

SUMMARY OF THE INVENTION

Embodiments of the present invention provide a method and a device for ensuring quality of service of an Internet Protocol television live broadcast service, so as to avoid a Nack storm and improve retransmission efficiency.

An embodiment of the present invention provides a method for ensuring quality of service of an Internet Protocol television live broadcast service, which includes:

detecting a live broadcast packet received from an original multicast group;

if detecting that the live broadcast packet has an error or a loss, joining a multicast group corresponding to a delay multicast stream sent by a retransmission server, and receiving a delay retransmission packet from the delay multicast stream; and recovering the live broadcast packet according to the received delay retransmission packet.

An embodiment of the present invention provides a terminal, which includes:

a receiving unit, configured to receive a live broadcast packet from an original multicast group, or receive a delay retransmission packet from a delay multicast stream;

a detecting unit, configured to detect the live broadcast packet received by the receiving unit, and determine whether the live broadcast packet has an error or a loss;

a joining unit, configured to join a multicast group corresponding to a delay multicast stream sent by a retransmission server, if the detecting unit detects that the received live broadcast packet has an error or a loss; and a recovering unit, configured to recover the live broadcast packet according to the delay retransmission packet received by the receiving unit.

An embodiment of the present invention provides a retransmission server, which includes:

a receiving unit, configured to receive a live broadcast packet from an original multicast group;

a buffer unit, configured to remove IP-layer encapsulation from the live broadcast packet received by the receiving unit and then buffer the live broadcast packet; and a delay sending unit, configured to retransmit the live broadcast packet buffered by the buffer unit and encapsulated with a new multicast IP, after a certain delay.

In the embodiments of the present invention, the retransmission server retransmits an original packet stream after a delay, and once a terminal detects the original packet has an error or a loss, the terminal directly receives a packet from the delay packet stream for recovering without sending a Nack message to the retransmission server with a request for data retransmission, thereby avoiding the Nack storm, simplifying the processing of the retransmission server, and improving the retransmission efficiency.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only about some embodiments of the present invention, and persons of ordinary skill in the art can derive other drawings from the accompanying drawings without creative efforts.

DETAILED DESCRIPTION OF THE EMBODIMENTS

In order to make the objectives, technical solutions, and advantages of the present invention more comprehensible, the technical solutions in the embodiments of the present invention are described clearly and completely with reference to the accompanying drawings in the embodiments of the present invention. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 1:
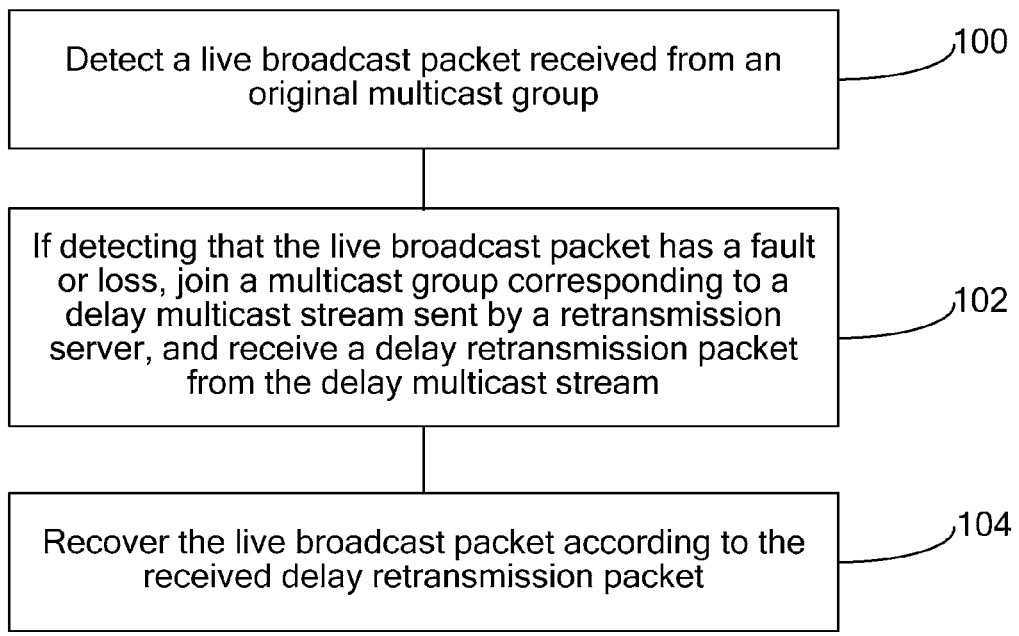
FIG. 1 is a schematic flow chart of an embodiment of a method for ensuring quality of service of an Internet Protocol television live broadcast service provided in the present invention.

FIG. 1 is a flow chart of an embodiment of a method for ensuring quality of service of an Internet Protocol television live broadcast service according to the present invention. As shown in FIG. 1, the method of this embodiment includes the following steps.

Step 100: Detect a live broadcast packet received from an original multicast group.

Step 102: When detecting that the live broadcast packet has an error or a loss, join a multicast group corresponding to a delay multicast stream sent by a retransmission server, and receive a delay retransmission packet from the delay multicast stream.

Step 104: Recover the live broadcast packet according to the received delay retransmission packet.

It should be noted that, before step 100, the method may further include: removing, by the retransmission server, IP-layer encapsulation from the received live broadcast packet and then storing the live broadcast packet in a buffer, and after a certain delay, retransmitting the buffered live broadcast packet encapsulated with a new multicast IP; and obtaining, by a terminal, live broadcast channel list information after interaction with an electronic program guide server, where the information at least includes a multicast IP address of the live broadcast packet and a multicast IP address of a delay retransmission packet.

Figure 2:
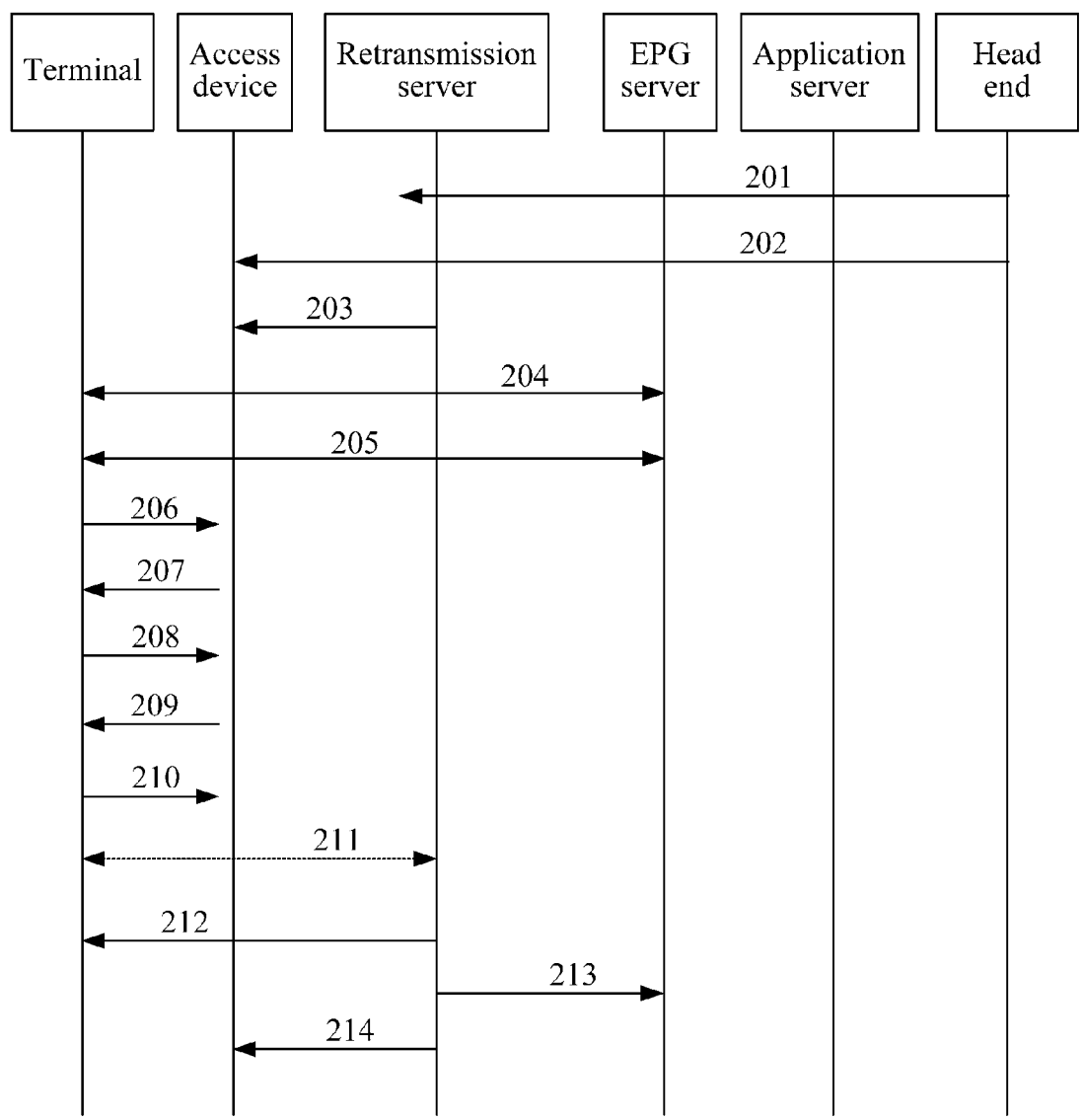
FIG. 2 is a schematic flow chart of another embodiment of a method for ensuring quality of service of an Internet Protocol television live broadcast service provided in the present invention.

FIG. 2 is a flow chart of another embodiment of a method for ensuring quality of service of an Internet Protocol television live broadcast service according to the present invention. In FIG. 2, a head end is a source providing programs and is used to convert outside program content into a format suitable for transmission in an IPTV network, for example, a live broadcast program that is based on an MPEG-2 encoding format and is transmitted through satellite is received and then transcoded into a program that is based on an H.264 encoding format. Actually, to save bandwidth, the regenerated live broadcast program is generally input to the IPTV network in an IP multicast manner for users to watch. As shown in FIG. 2, this embodiment specifically includes:

Step 201: During deployment, the retransmission server joins a multicast group of a multicast packet delivered from the head end, receives program content of a live broadcast channel, removes IP-layer encapsulation from a received packet, and then stores the packet in a buffer.

It should be noted that, a media server is generally deployed in an IPTV system to provide a user with a Video On Demand (Video On Demand, VOD for short) service, so in actual applications, the media server may be used as the retransmission server for a live broadcast service or a retransmission server is separately deployed to provide a live broadcast retransmission function.

Step 202: To shorten a multicast joining delay, directly push the program content of the live broadcast channel to an access device during program deployment, that is, the access device also join the multicast group to receive the multicast packet. In actual applications, common access devices include an IP-DSLAM and a GEPON.

Step 203: The retransmission server also pushes the buffered packet to the access device in a multicast manner after a certain delay.

That is, the retransmission server sends the buffered packet of the live broadcast program encapsulated with a pre-allocated new multicast IP after a certain delay. The value of the delay is determined according to at least one of the following factors: a packet transmission delay via a network, a detection delay when a terminal detects that the packet has a loss or an error, and a processing delay when the terminal joins a new multicast group. The delay values may be determined according to network plan in actual applications.

It should be noted that, in this step, the retransmission server may also push multiple multicast streams with different delays to the access device, and each multicast stream has a different delay from an original multicast stream, so as to meet requirements of different terminals.

Step 204: The terminal first interacts with an application server after startup to perform necessary authentication, so as to ensure legal use of the service.

Step 205: After passing the authentication, the terminal interacts with an electronic program guide (Electronic Program Guide, EPG for short) server to obtain live broadcast channel list information.

It should be noted that, in addition to a multicast IP address of a normal live broadcast program and encoding/decoding parameter information that is used for decoding the audio/video code stream of the live broadcast program, the live broadcast channel list information further includes information of a packet stream transmitted with a delay in a multicast manner. Therefore, when the terminal detects that the packet has a loss or an error, the terminal is informed of joining which multicast group to receive a retransmission packet stream and recover the packet. An example is illustrated in the following for showing parameters of a certain channel in a channel list provided in a Session Description Protocol (session description protocol, SDP for short) form:

v=0
    0=–2890844526 2890842807 IN IP4 192.16.24.202
    s=SDP Session
    a=control: sdp://ts.example.com/twister/cctv1
    m=video 7722 MP2T/AVP 33//In RFC3551, 33 is defined as a PT type corresponding to an MPEG-2 TS stream
    c=IN IP4 224.2.1.183//a multicast IP address of a program
    a=rtcp:3021 IN IP4 126.16.64.4//The retransmission server that receives a Nack message receives an IP address and a port number of an RTCP message
    a=delay–stream: delay=200; port=7722, IN IP4 192.16.24.204//The delay of a delay retransmission multicast stream is 200 ms relative to an original stream, a multicast IP address of the delay retransmission multicast stream is 192.16.24.204, and the delay retransmission stream uses the same port number as that of the original stream.

If the retransmission server sends multiple multicast streams (for example, two) with different delays in step 203, an example of parameters of a certain channel in the channel list may be illustrated in the following:

v=0
    0=–2890844526 2890842807 IN IP4 192.16.24.202
    s=SDP Session
    a=control: sdp://ts.example.com/twister/cctv1
    m=video 7722 MP2T/AVP 33//In RFC3551, 33 is defined as a PT type corresponding to an MPEG-2 TS stream
    c=IN IP4 224.2.1.183//a multicast IP address of a program
    a=rtcp:3021 IN IP4 126.16.64.4//The retransmission server that receives a Nack message receives an IP address and a port number of an RTCP message
    a=delay–stream: delay=200; port=7722, IN IP4 192.16.24.204//The delay of a delay retransmission multicast stream 1 is 200 ms relative to an original stream, a multicast IP address of the delay retransmission multicast stream 1 is 192.16.24.204, and the delay retransmission stream uses the same port number as that of the original stream
    a=delay–stream: delay=300; port=7722, IN IP4 192.16.24.206//The delay of a delay retransmission multicast stream 2 is 300 ms relative to an original stream, a multicast IP address of the delay retransmission multicast stream 2 is 192.16.24.206, and the delay retransmission stream uses the same port number as that of the original stream.

It should be noted that, the information of the retransmission stream is exemplarily indicated by extending SDP description, and other manners of extending description may also be used as long as the terminal can understands the meaning of the manners.

Step 206: The terminal switches to a designated channel in a normal channel switching manner through the access device, that is, the terminal joins a multicast group corresponding to the designated channel through an Internet Group Management Protocol (Internet Group Management Protocol, IGMP for short) message.

Step 207: The access device forwards the multicast packet of the designated channel to the terminal after completing IGMP message processing, and after the terminal receives the multicast packet of an original multicast group, the terminal normally decodes the multicast packet and outputs the multicast packet.

Step 208: If the terminal detects that the multicast packet received from the original multicast group has an error or a loss, the terminal immediately joins, through the IGMP message, a multicast group corresponding to a delay multicast stream broadcasted by the retransmission server.

It should be noted that, in the case that multiple delay multicast streams exist, since the terminal can join multiple multicast groups and each multicast group has a different delay from the original multicast stream, the terminal may select an appropriate multicast group according to a network transmission delay, a delay in detecting that the packet has a loss or an error, and a delay in joining the multicast group, and join the appropriate multicast group. In addition, multiple delay multicast streams with delay differences exist, so if the terminal does not find a recoverable packet from a latest delay multicast stream, the terminal may join a next delay multicast stream to continue the search.

Step 209: The access device forwards a delay retransmission multicast packet to the terminal after completing the IGMP message processing.

Step 210: The terminal receives a packet from the delay multicast stream.

Specifically, the terminal directly discards the packet correctly received from the original multicast stream, and after finding a packet, which is required to be recovered, from the delay multicast stream, the terminal withdraws from the multicast group through the IGMP message, merely reserves the original multicast group and continuously receives the packet from the original multicast group.

Figure 3:
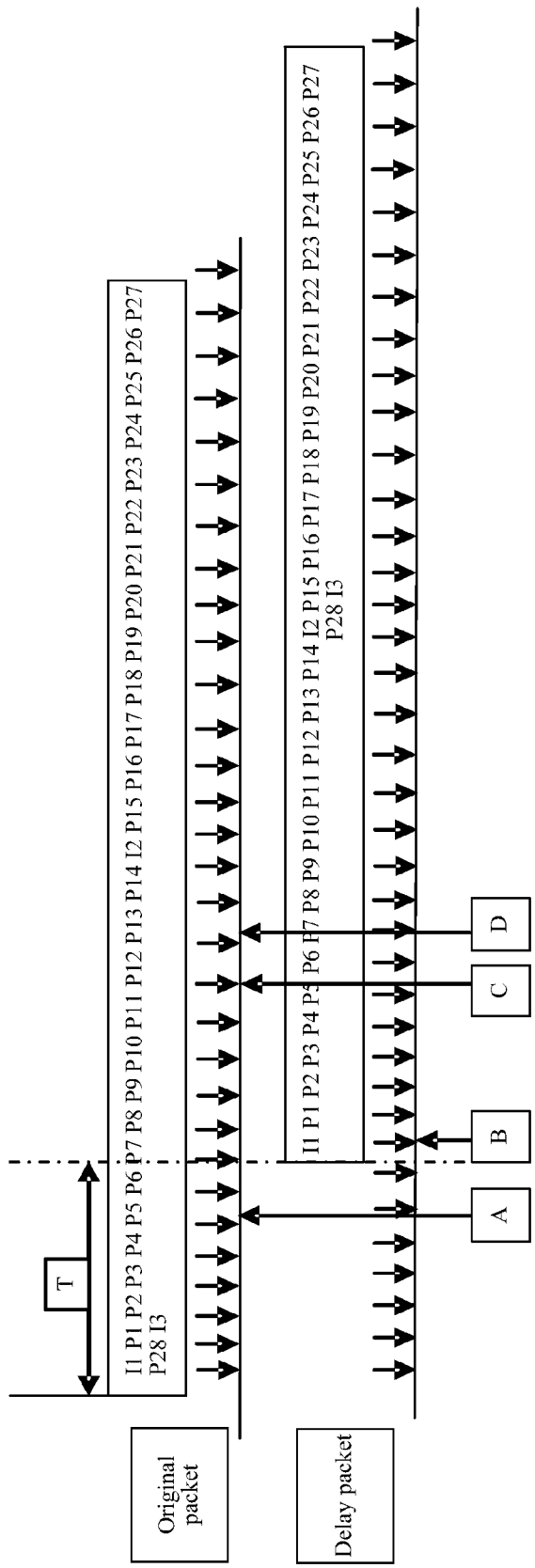
FIG. 3 is a schematic diagram of a terminal receiving a delay packet from a delay multicast stream when the terminal detecting the packet loss provided in an embodiment of the present invention.

FIG. 3 shows an example for describing the above steps. In FIG. 3, a delay of the delay retransmission packet is set to T relative to the delay of an original live broadcast packet. It is assumed that a user originally receives the original packet stream, and at a time point A, detects a packet corresponding to P5 is lost, the terminal joins a multicast stream where the delay packet is located and prepares to receive the lost packet from the delay retransmission stream again.

As shown in FIG. 3, if the terminal begins to receive the delay packet stream at a time point B, the terminal directly discards the packet that is previously received from the original packet stream. If at a time point C, the terminal receives the P5 packet used for recovery, the terminal withdraws from the multicast group at a time point D and continues to receive the original packet stream from the original multicast group.

Step 211: If after the terminal joins the delay retransmission multicast stream, the terminal finds that a desired packet is missed, or time for the terminal to decode the packet is missed though the terminal receives the retransmission packet, the received retransmission packet is invalid finally, and the terminal may directly request the retransmission server to retransmit the packet.

Specifically, for the case that the delay of the retransmission packet stream is not appropriately set, the terminal may feed back it to the retransmission server through an extended Real-time Control Protocol (Real-time Control Protocol, RTCP for short) message, and the extended RTCP message may be multiplexed with an original Nack message for transmission. After receiving the feedback information from multiple terminals, the retransmission server may adjust the delay of the retransmission stream, or add a new retransmission stream.

According to the information obtained in step 205, a destination IP address and a port number of the extended RTCP message and the Nack message are 126.16.64.4 and 3021, respectively. The extended RTCP message needs to indicate a detection delay and a multicast joining delay of a current terminal, and may further include a sequence number of a latest Real-time Transport Protocol (Real-time Transport Protocol, RTP for short) packet received by the terminal and time information of Universal Time Coordinated (Universal Time Coordinated, UTC for short) corresponding to the time when the RTP packet is received, so that the retransmission server calculates the network transmission delay. The format of the extended RTCP message may have multiple construction manners as long as the foregoing information is included. In the type of the RTCP message, an APP message that can be extended according to actual application requirements is taken as an example for description in the following. A format of the APP message is as follows:

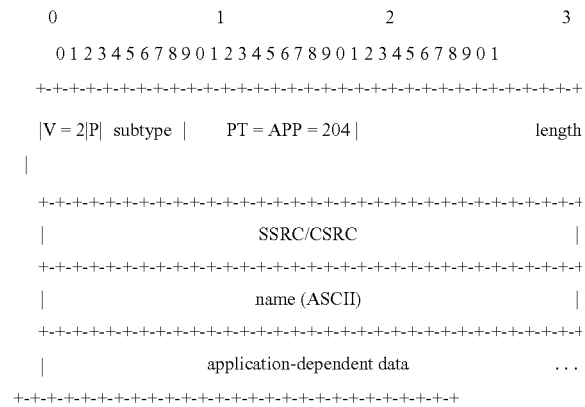

The PT type of the APP message is fixed to 204, and the subtype (5 bits) may be extended according to actual applications. The APP message transmits related information mainly by using application-dependent data, and here, the part of the application-dependent data is defined in the following:

| Sequence number of a newly received RTP packet (16 bits) | Reserved (16 bits) |
|---|---|
| 32 high bits in UTC time information corresponding to the time when a latest RTP packet is received (32 bits, ms) | |
| 32 low bits in UTC time information corresponding to the time when a latest RTP packet is received (32 bits, ms) | |
| Detection delay of the terminal (32 bits, ms) | |
| Multicast joining delay of the terminal (32 bits, ms) | |

Step 212: after receiving the RTCP message, the retransmission server compares, according to the sequence number of the latest RTP packet and the UTC time information corresponding to the time when the RTP packet is received, the UTC time corresponding to the time when the RTP packet is received with the UTC time at which the packet is received by the retransmission server itself, where the sequence number of the latest RTP packet and the UTC time information corresponding to the time when the RTP packet is received are reported by the terminal; and then can calculate the transmission delay between the retransmission server and the terminal; and in combination with the reported detection delay of the terminal and the reported multicast joining delay of the terminal, can estimate the length of the delay with which the terminal begins to receive the retransmission stream relative to the original multicast stream if the terminal detects packet loss or packet error, so that the delay of the retransmission stream can be adjusted, or a new retransmission stream is added according to the requirements.

After adjusting the retransmission stream or adding the new retransmission stream, the retransmission server needs to periodically broadcast adjusted retransmission stream information or newly added retransmission stream information to the terminal through the extended RTCP message, where the extended RTCP message includes information of all retransmission streams of a current channel. Here, two retransmission streams are used for an example to define the part of the application-dependent data in the following:

| Delay of retransmission stream 1 (16 bits, ms) | Port of retransmission stream 1 (16 bits) |
|---|---|
| Multicast IP address of retransmission stream 1 (32 bits) | |
| Delay of retransmission stream 2 (16 bits, ms) | Port of retransmission stream 2 (16 bits) |
| Multicast IP address of retransmission stream 2 (32 bits) | |

Step 213: At the same time when the retransmission server periodically broadcasts the adjusted retransmission stream information or the newly added retransmission stream information to the terminal, the retransmission server synchronizes the foregoing information onto an electronic program guide server. In this way, a new terminal may also obtain information of the new retransmission stream.

Step 214: The retransmission server continuously sends a retransmission stream to the access device.

It should be noted that, since in I, P, B frames output through video encoding, the I frame is the most important, a decoder begins to perform decoding necessarily after receiving the I frame, and if the P frame or the B frame is lost, some interpolation methods may be considered to forecast recovery. Therefore, in consideration of saving bandwidth, in the embodiment of the present invention, the delay multicast stream may merely retransmit the I frame. If data of the P frame or the B frame is lost, the effect of the packet loss on image quality is reduced locally through an error concealment method. Correspondingly, when the terminal detects the original live broadcast packet, the terminal joins the retransmission multicast group to receive the retransmission packet merely when finding that the packet corresponding to the I frame is lost.

Through the method provided by the embodiment of the present invention, the retransmission server retransmits the original packet stream after a delay, and once the terminal detects the packet loss, the terminal directly receives a packet from the delay packet stream for recovering without sending a Nack message to the retransmission server to request data retransmission, thereby avoiding the Nack storm, simplifying the processing of the retransmission server, and improving the retransmission efficiency.

Figure 4:
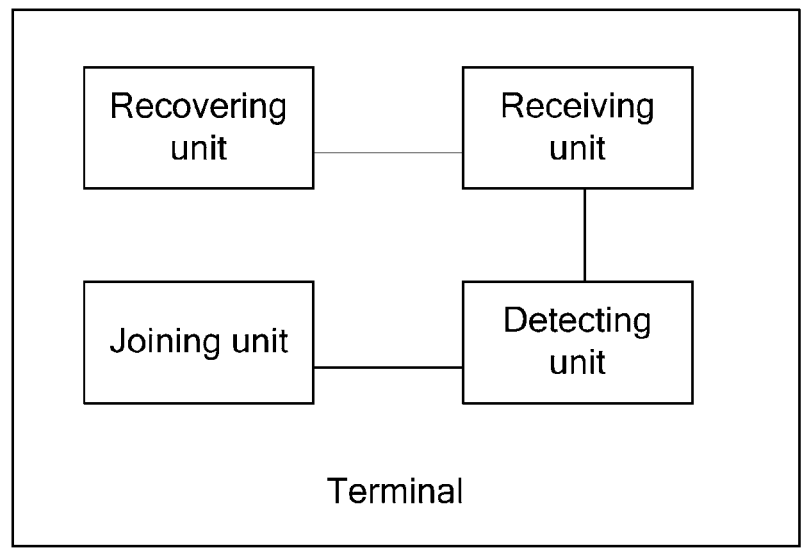
FIG. 4 is a schematic structural diagram of a terminal provided in an embodiment of the present invention.

FIG. 4 is a schematic structural diagram of a terminal provided in an embodiment of the present invention. As shown in FIG. 4, the terminal may include a receiving unit, a detecting unit, a joining unit and a recovering unit. The receiving unit is configured to receive a live broadcast packet from an original multicast group, or receive a delay retransmission packet from a delay multicast stream; the detecting unit is configured to detect the live broadcast packet received by the receiving unit, and determine whether the live broadcast packet has an error or a loss; the joining unit is configured to join a multicast group corresponding to a delay multicast stream sent by a retransmission server, if the detecting unit detects that the received live broadcast packet has an error or a loss; and the recovering unit is configured to recover the live broadcast packet according to the delay retransmission packet received by the receiving unit.

Further, the terminal may also include (not shown): an information obtaining unit, configured to obtain live broadcast channel list information through interaction with an electronic program guide server, where the information at least includes a multicast IP address of the live broadcast packet and a multicast IP address of the delay retransmission packet; and a reporting unit, configured to report corresponding packet information to the retransmission server when the receiving unit does not receive a desired packet from the delay multicast stream sent by the retransmission server or misses the time when the terminal decodes the packet though a desired packet is received.

Figure 5:
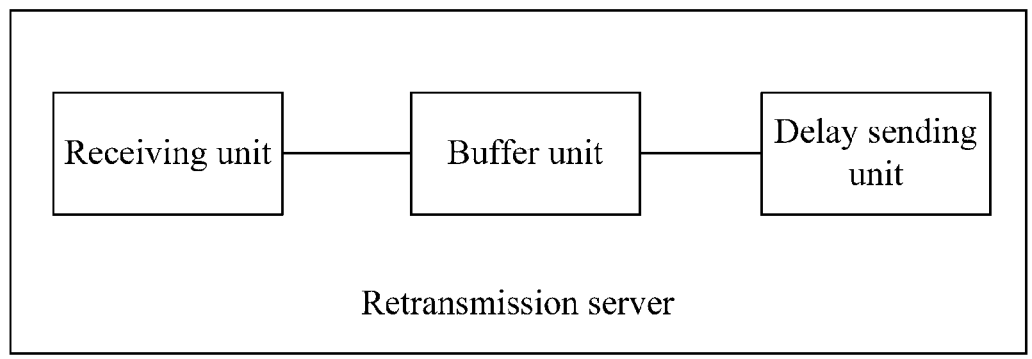
FIG. 5 is a schematic structural diagram of a retransmission server provided in an embodiment of the present invention.

FIG. 5 is a schematic structural diagram of a retransmission server provided in an embodiment of the present invention. As shown in FIG. 5, the retransmission server may include a receiving unit, a buffer unit and a delay sending unit. The receiving unit is configured to receive a live broadcast packet from an original multicast group; the buffer unit is configured to remove IP-layer encapsulation from the live broadcast packet received by the receiving unit and then buffer the live broadcast packet; and the delay sending unit is configured to retransmit the live broadcast packet which is buffered by the buffer unit and is encapsulated with a new multicast IP after a certain delay.

Further, the retransmission server may further include (not shown): a synchronization unit, configured to synchronize delay retransmission information to an electronic program guide server, where the delay retransmission information at least includes a multicast IP address corresponding to a delay retransmission packet; an adjusting unit, configured to, according to packet information reported by a terminal, adjust a delay of a delay multicast stream corresponding to the packet information or add a new delay multicast stream; and a broadcasting unit, configured to, after the adjusting unit adjusts the delay of the delay multicast stream corresponding to the packet information or adds the new delay multicast stream, periodically broadcast the change to the terminal.

Through the method and device provided by the embodiments of the present invention, the retransmission server retransmits the original packet stream after a delay, and once the terminal detects the packet loss, the terminal directly receives a packet from the delay packet stream for recovering without sending a Nack message to the retransmission server to request data retransmission, thereby avoiding the Nack storm, simplifying the processing of the retransmission server, and improving the retransmission efficiency.

Those of ordinary skill in the art should understand that all or a part of the steps of the method according to the embodiments of the present invention may be implemented by a program instructing relevant hardware. The program may be stored in a computer readable storage medium. When the program is executed, the steps of the method according to the embodiments of the present invention are performed. The storage medium includes any medium that is capable of storing program codes, such as a ROM, a RAM, a magnetic disk, or an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, and such modifications or replacements cannot cause the essence of the corresponding technical solutions to depart from the idea and the scope of the technical solutions in the embodiments of the present invention.

What is claimed is:

1. A method for ensuring quality of service of an Internet Protocol (IP) television live broadcast service, comprising:
   detecting a live broadcast packet received from an original multicast group;
   joining a plurality of multicast groups, wherein each multicast group corresponds to a different delay multicast stream associated with a different delay amount;
   detecting that the live broadcast packet has an error or a loss;
   in response to the detecting, selecting a first multicast group from the plurality of multicast groups based on each of a network transmission delay, a detection delay in detecting that the live broadcast packet has the error or the loss, and a processing delay in joining the first multicast group;
   receiving a delay retransmission packet from a first delay multicast stream corresponding to the first multicast group; and
   recovering the live broadcast packet according to the received delay retransmission packet.

2. The method according to claim 1, wherein before the detecting the live broadcast packet received from the original multicast group, the method further comprises:
   obtaining live broadcast channel list information through interaction with an electronic program guide server, wherein the live broadcast channel list information at least comprises a multicast IP address of the live broadcast packet and a multicast IP address of the delay retransmission packet.

3. The method according to claim 2, wherein before the obtaining the live broadcast channel list information through the interaction with the electronic program guide server, the method further comprises:
   after removing, by the retransmission server, IP-layer encapsulation from the received live broadcast packet, storing the received live broadcast packet in a buffer, and after a certain delay, retransmitting the buffered live broadcast packet which is encapsulated with a new multicast IP.

4. The method according to claim 3, wherein the retransmission server retransmits the buffered live broadcast packet after the certain delay for at least once, and a packet sent at each time corresponds to a different sending moment and a different multicast IP address.

5. The method according to claim 3, wherein the retransmission server synchronizes delay retransmission information to the electronic program guide server, and the delay retransmission information at least comprises a multicast IP address corresponding to the delay retransmission packet.

6. The method according to claim 1, wherein selecting the first multicast group is based on each of the network transmission delay, the detection delay, and the processing delay.

7. The method according to claim 1, wherein the delay retransmission packet consists of an I frame.

8. The method according to claim 1, wherein if a desired packet is not received from the first delay multicast stream sent by the retransmission server, the method further comprising:
   reporting corresponding packet information to the retransmission server; wherein the retransmission server adjusts a delay of the first delay multicast stream corresponding to the packet information or selects a different delay multicast stream according to the packet information reported to the retransmission server.

9. The method according to claim 8, wherein after the retransmission server adjusts the delay of the first delay multicast stream corresponding to the packet information or selects the different delay multicast stream, the retransmission server periodically broadcasts the change and synchronizes the change to an electronic program guide server.

10. A terminal, comprising:
- a receiving unit, configured to receive a live broadcast packet from an original multicast group, or receive a delay retransmission packet from a first delay multicast stream corresponding to a first multicast group;
- a detecting unit, configured to detect the live broadcast packet received by the receiving unit, and determine whether the live broadcast packet has an error or a loss;
- a joining unit, configured to join a plurality of multicast groups, wherein each multicast group corresponds to a different delay multicast stream associated with a different delay amount, wherein in response to the detecting, the terminal selects the first delay multicast group from the plurality of multicast groups based on each of a network transmission delay, a detection delay in detecting that the live broadcast packet has the error or the loss, and a processing delay in joining the first multicast group; and
- a recovering unit, configured to recover the received live broadcast packet according to the delay retransmission packet received by the receiving unit.

11. The terminal according to claim 10, further comprising:
- an information obtaining unit, configured to obtain live broadcast channel list information through interaction with an electronic program guide server, wherein the live broadcast channel list information at least comprises a multicast IP address of the live broadcast packet and a multicast IP address of the delay retransmission packet.

12. The terminal according to claim 10, further comprising:
- a reporting unit, configured to report corresponding packet information to the retransmission server if the receiving unit does not receive a desired packet from the first delay multicast stream sent by the retransmission server, or the receiving unit misses time when the terminal decodes the packet though a desired packet is received.

* * * * *